(No Model.)  7 Sheets—Sheet 1.

G. W. BURR.
VALVE.

No. 426,635.  Patented Apr. 29, 1890.

Witnesses:
Frank C. Curtis.
John T. Booth.

Inventor:
George W. Burr
by Geo. A. Mosher
atty.

(No Model.)  7 Sheets—Sheet 2.

G. W. BURR.
VALVE.

No. 426,635.  Patented Apr. 29, 1890.

Witnesses:
Frank C. Curtis
John T. Booth

Inventor:
George W. Burr,
by Geo. A. Mosher
atty.

(No Model.)

G. W. BURR.
VALVE.

Patented Apr. 29, 1890.

Witnesses:
Frank C. Curtis.
John T. Booth.

Inventor:
George W. Burr
by Geo. H. Mosher
atty.

(No Model.)

G. W. BURR.
VALVE.

Patented Apr. 29, 1890.

Witnesses:
Frank C. Curtis.
John T. Booch.

Inventor:
George W. Burr
by Geo. A. Mosher
atty.

(No Model.) 7 Sheets—Sheet 5.

G. W. BURR.
VALVE.

No. 426,635. Patented Apr. 29, 1890.

Witnesses:
Frank C. Curtis
John T. Booth

Inventor:
George W. Burr
by Geo. A. Mosher
Atty.

(No Model.)
7 Sheets—Sheet 6.

G. W. BURR.
VALVE.

No. 426,635.  Patented Apr. 29, 1890.

Witnesses:
Frank C. Curtis
John T. Booth

Inventor:
George W. Burr
by Geo. A. Mosher
Atty.

(No Model.) 7 Sheets—Sheet 7.

G. W. BURR.
VALVE.

No. 426,635. Patented Apr. 29, 1890.

Witnesses:
Frank C. Curtis
John T. Booth

Inventor:
George W. Burr
by Geo. M. Mosher
atty.

THE NORRIS PETERS CO., PHOTO-LITHO., WASHINGTON, D. C.

UNITED STATES PATENT OFFICE.

GEORGE W. BURR, OF ROUND LAKE, NEW YORK.

VALVE.

SPECIFICATION forming part of Letters Patent No. 426,635, dated April 29, 1890.

Application filed February 20, 1889. Serial No. 300,579. (No model.)

*To all whom it may concern:*

Be it known that I, GEORGE W. BURR, a resident of Round Lake, in the county of Saratoga and State of New York, have invented certain new and useful Improvements in Valves; and I do hereby declare that the following is a full, clear, and exact description of the invention, that will enable others skilled in the art to which it appertains to make and use the same, reference being had to the accompanying drawings, and to the letters of reference marked thereon, which form a part of this specification, similar letters referring to similar parts in the several figures therein.

My invention relates to improvements in valves; and it consists of the novel construction and combination of parts hereinafter described, and pointed out in the claims.

Large valves, known as "stop-valves," as heretofore constructed have usually consisted of a case and disk-gates, either single or double, occupying a chamber in the valve-case at one side of the passage-way when the latter was open, and a screw for forcing the gates into the passage-way against surrounding seats to stop the way. The gates were usually seated by means of wedge-shaped abutments secured to or forming a part of the case, against which the gates were forced by the screw during the latter part of their movement transversely across the passage-way. In such forms of construction, when large valves are desired, long and powerful screws are required to lift or move the valves a distance equal to the diameter of the passage-way, and that, too, while subjected to a large part or all of the internal pressure of the fluid contained within the pipes, making it a very long and laborious operation to fully open and close a large gate, and as the gates must be given a further transverse movement against the wedge-shaped abutments after the gates have come into contact with their seats, in order to tightly force them against their seats, more or less abrasion of the valve-seat results from sliding one surface upon the other under pressure, which injures and tends to destroy the valve.

In the construction of my improved valve I make use of a rotary stem and head similar to the spigot of a small stop-cock. The valve-head is provided with a central passage-way of the desired capacity, and upon opposite sides with a gate loosely mounted thereon. The head and gates are together so shaped as to loosely fit and turn in a circular opening in the valve-case, which opening intersects the passage-way at right angles. When the aperture in the head registers with the passage-way openings in the case, the valve is open. To close the valve it is only necessary to give the head a quarter-turn and afterward force the gates out from the head against suitable seats on the case surrounding the passage-way openings. The gates are thus seated by a system of cams and levers, as will be hereinafter fully described.

Figure 1:
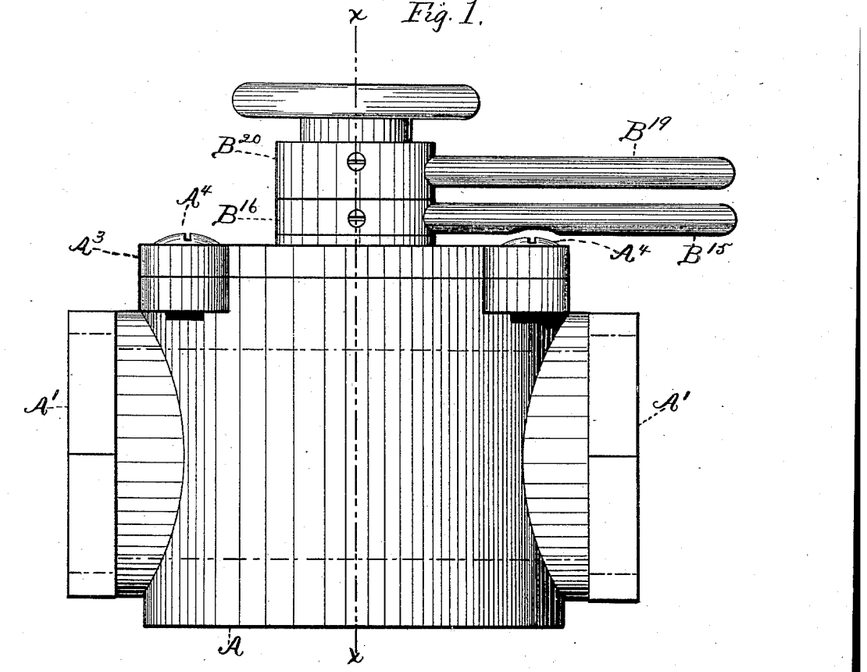
Figures 1 and 2 are respectively side and end elevations of my improved valves.
Figure 2:
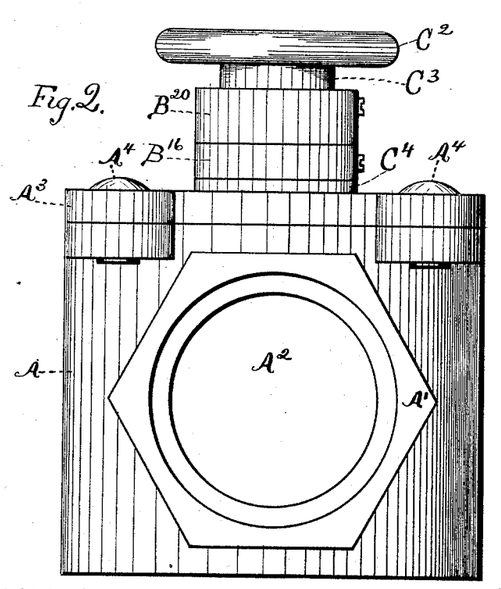

I have shown in Figs. 1 and 2, respectively, side and end elevations of the valve-case A, which is provided on opposite sides with coupling-flanges A', adapted to be connected with the conduit-pipe. The case is also provided with a central circular chamber having an upper central opening and opposite lateral openings extending through the coupling-flanges to form the passage-way $A^2$. (Shown by the inner circular line in Fig. 2 and indicated by the horizontal broken line in Figs. 1, 3, and 4.) The case is also provided with a cover or cap $A^3$. (Shown secured to the case in Figs. 1 and 2 by screws $A^4$.)

Figure 3:
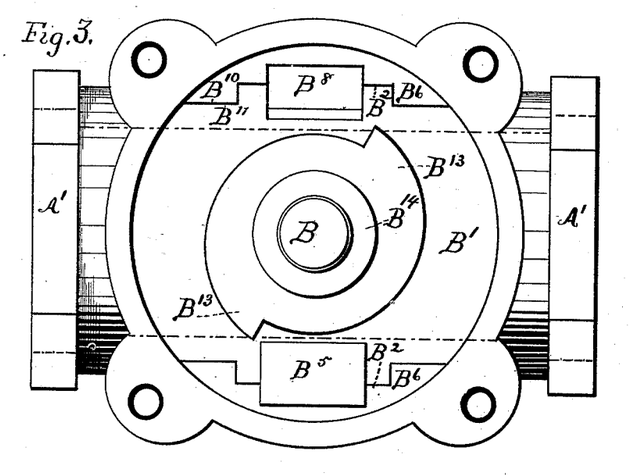
Figs. 3 and 4 are top plan views of the same with the cap and operating-levers detached, respectively showing the relative positions of the valve when open and closed.
Figure 4:
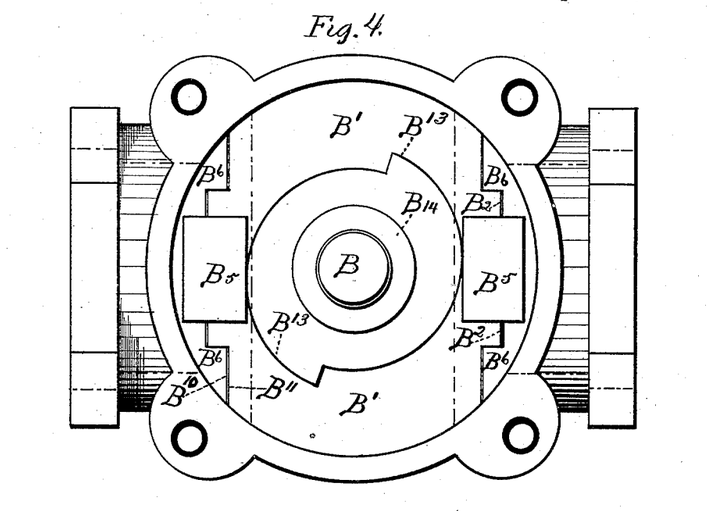

In Figs. 3 and 4 the case is shown with the cap detached.

Figure 6:
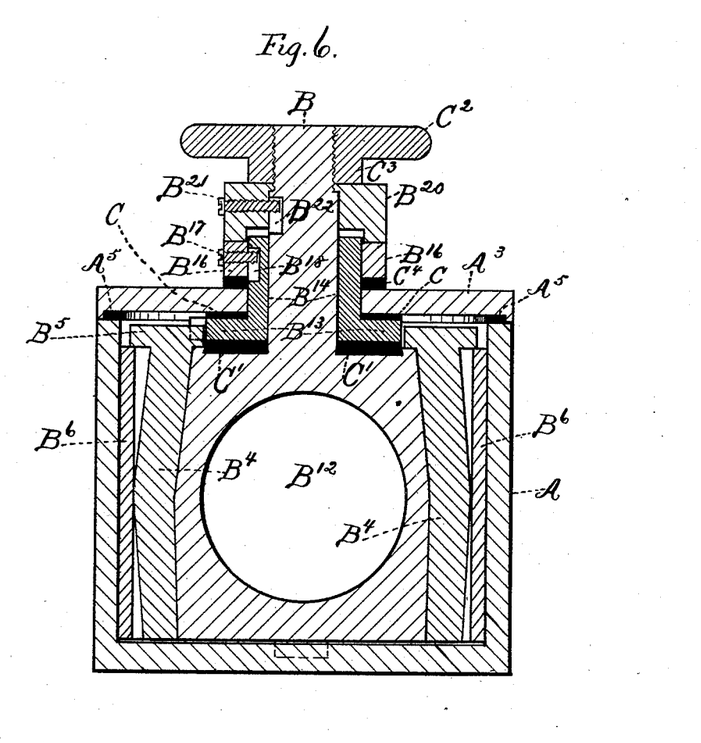
Fig. 6 is a central vertical section taken on the broken line $x\ x$ in Fig. 1.

In Fig. 6 I have shown in section a packing-ring $A^5$ between the upper edge of the case and the cap for the purpose of producing a tight joint between the case and the cap.

Figure 5:
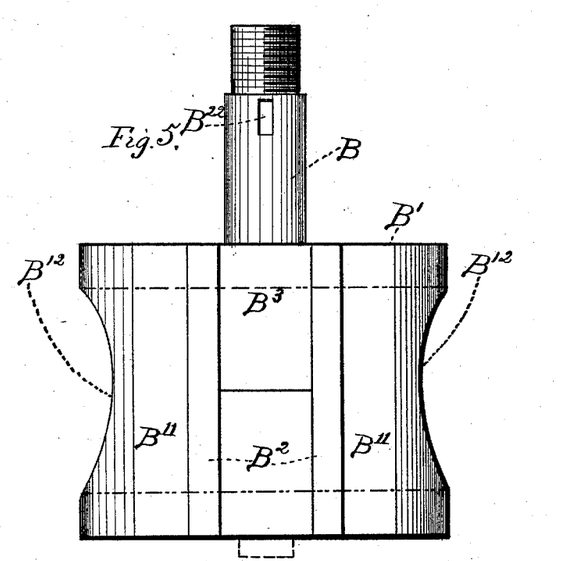
Fig. 5 is a side elevation of the valve stem and head.

In Fig. 5 I have shown in side elevation the valve-stem B and valve-head B' removed from the case and divested of the valve-gates, cams, and sleeves.

Figure 7:
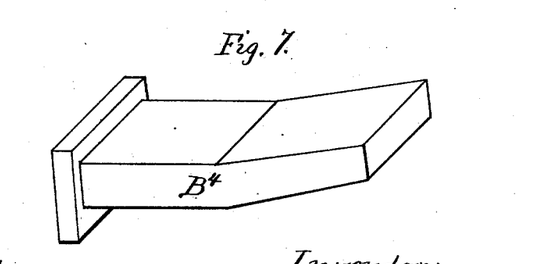
Fig. 7 is a view in perspective of a gate-closing cam-lever.
Figure 8:
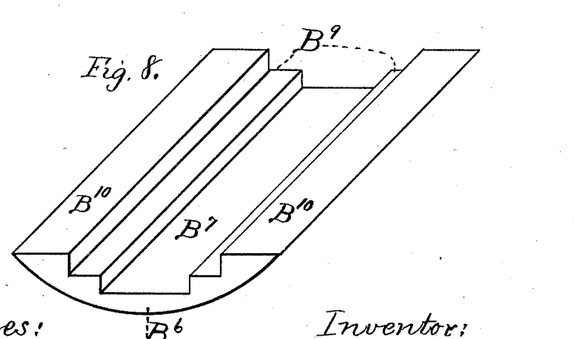
Fig. 8 is a view in perspective of one of the gates.

In Figs. 3 and 4 the stems and head are shown in a top plan view inserted within the circular chamber within the case. Two opposite sides of the head are somewhat flattened and provided with the gate-flanges $B^2$, forming between them a groove $B^3$, adapted to receive gate-seating levers $B^4$, having heads $B^5$. One of the gate-seating levers is shown in perspective in Fig. 7 and in position on the valve-head in Figs. 4 and 6. One of the gates $B^6$ is shown in perspective in Fig. 8. The relative positions of the two gates are shown in section in Fig. 6 and in top plan view in Figs. 3 and 4.

$B^7$ is a groove in the gate adapted to register with the groove $B^3$ in the head and to form a guide-socket $B^8$ for the levers $B^4$, as shown in Fig. 3.

The grooves $B^9$ in the gate are adapted to fit and receive the flanges $B^2$ on the head, as shown in Figs. 3 and 4, and, as seen in the same figures, the plane surfaces $B^2$ of the gate rest upon the surfaces $B^{11}$ of the head. It will thus be seen that when the two gates are set in place upon the head the peripheries of the head and gates taken together are circular in form and are made to loosely fit the central circular chamber in the valve-case.

The head is provided with the central aperture $B^{12}$, extending transversely through the same, as indicated by dotted lines in Figs. 3, 4, and 5.

When the head and gates are in the position shown in Fig. 3, the valve is open and the aperture in the head registers with and forms a continuation of the passage-ways through the coupling-flanges, as indicated by dotted line in Fig. 3. In this figure one of the levers $B^5$ is removed to better show the grooves in the head and gate forming its socket.

It is evident from the foregoing that if the head and gates be given a quarter-turn from the position shown in Fig. 3 to that shown in Fig. 4 the passage-way will be cut off by the gates at the inner mouth of the apertures through the coupling-flanges. To tightly close said aperture, it is only necessary to force the circular periphery of the gates tightly against the circular shell of the case surrounding such apertures. I do this by means of the levers $B^4$ and the cams $B^{13}$. The power exerted by the cam is imparted to the lever at one end through its head $B^5$. The lever belongs to that class of levers known as the "second class," and is fulcrumed at the other or opposite end upon the valve-head and acts upon the weight, which in this case is the gate, through a single point of contact, which point is midway between the ends of the lever and opposite the center of the aperture or passage-way closed by the gate. The power being applied at the central part of the gate and opposite the center of the aperture, every part of the gate is forced tightly against its seat.

The double cam $B^{13}$ is provided with a right-angular sleeve or boss $B^{14}$, having a central aperture adapted to receive and fit the valve-stem. This boss projects up through a central aperture in the cap $A^3$, as shown in Fig. 6, and is provided with an operating-lever $B^{15}$, which has a head $B^{16}$, provided with a central aperture adapted to receive such sleeve, being secured thereon by a set-screw $B^{17}$, vertically movable in the slot $B^{18}$.

The lever $B^{19}$, provided with the head $B^{20}$, having a central aperture adapted to receive and fit the valve-stem B, and adapted to be secured thereon by a set-screw $B^{21}$, vertically movable in the slot $B^{22}$, serves to rotate the gate-supporting head to open and close the passage-way through the valve.

When desired, the cap may be provided with any well-known mechanism for producing a tight joint between the cap and stem rotary therein; but I prefer to make use of a packing-ring C, of metal or other material, to be pressed against the inner side of the cap around the stem-opening by a boss, flange, or other support secured to the stem. I have shown in Fig. 6 the ring surrounding the cam-sleeve and inclosed between the cap and the cam; also, a second packing-ring C', surrounding the stem and inclosed between the cam and the gate-supporting head. The projecting end of the stem is threaded and provided with a hand-nut $C^2$, having a boss $C^3$, which bears upon the head $B^{20}$. As the heads $B^{20}$ and $B^{16}$ and the washer $C^4$ fit loosely upon the stem and sleeve, the latter are vertically movable therein and can be driven up through the cap by turning the nut until the packing-rings are tightly compressed and the joints between the cap, cam, and head made tight.

Figure 9:
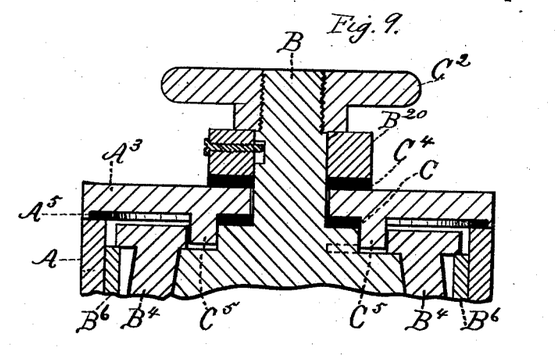
Fig. 9 is a central vertical section similar to that shown in Fig. 6 of a portion of a valve modified slightly in form.
Figure 10:
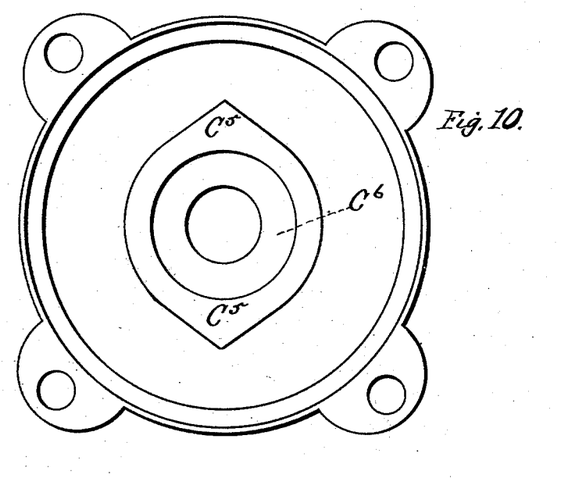
Fig. 10 is a plan view of the inner or bottom side of a modified form of cap detached from the case.
Figure 11:
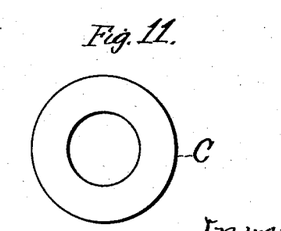
Fig. 11 is a top plan view of a packing-ring.

When desired, the cams which operate the gate-levers $B^4$ may be secured to or form a part of the cap, as shown at $C^5$ in Figs. 9 and 10, dispensing with the cam-sleeve $B^{14}$ and its operating-lever $B^{15}$; but such a form of construction necessitates a slide movement of the gates on their seats while they are being seated, because the gates, as well as the levers, partake of the revoluble movement of the head, which brings the levers into engagement with the stationary cams to seat the gates.

As no cam-sleeve follows the valve-stem up through the cap, it is only necessary to pack the joint between the stem and the cap, which is done by a single ring C, forced into the aperture $C^6$ central of the cams on the cap.

The washer $C^4$ (shown in Figs. 6 and 9) is only required to serve the purposes of an ordinary washer, and may be dispensed with without impairing the operation of my improved device. The washer may be made of iron, as well as all the other parts of device contiguous to it; but the packing-rings are made of some softer metal, as brass, and are preferably forced into a retaining groove or channel in the plate or head, so as to remain fixed and relatively stationary therein, as shown, so that the friction resulting from the movement of the parts of the joint one upon another will maintain their engaging-surfaces in a smooth condition, whereby the parts can be drawn together by the hand-nut $C^2$ to form a tight joint and leave the parts in a condition to be easily moved one upon another. When desired, the parts can be easily loosened to operate the valve, and, after the valve is closed, tightened again by the hand-nut. I am thus able to dispense with a stuffing-nut or fibrous packing, and at the same time provide a practically-tight joint that will not permit the leakage of the most penetrating oils.

In the last seven figures I have shown a preferred means for operating my improved valve. In Fig. 9 I have shown the valve operated by a single handle or lever; but the gates partake of the revoluble movement of the head while being seated. When the valve is operated, as shown in Fig. 6, the gates are not seated until their revoluble movement upon or with the head has ceased; but two operating-levers are required, one to open or close the valve and the other to seat or unseat the gates. In my preferred method the operation of the valve is precisely the same as that shown and described in connection with Fig. 6, except that only one uninterrupted movement of a single lever-handle is required to accomplish the result obtained by a separate movement of two operating-handles, as shown and described in connection with Fig. 6.

Figure 12:
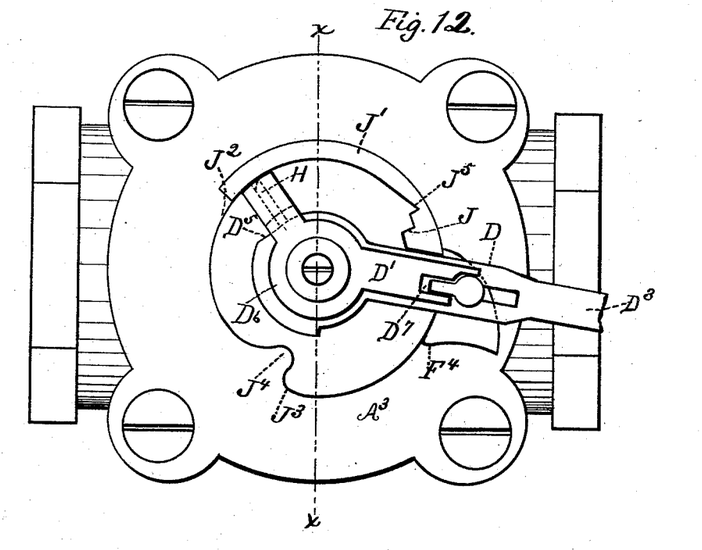
Fig. 12 is a top plan view showing a preferred mechanism for operating the valve and gates in a position occupied when the valve is open.
Figure 15:
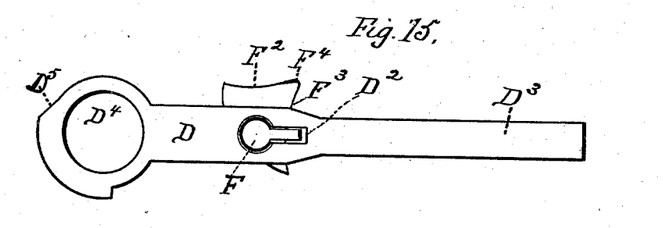
Fig. 15 is a top plan view of the cam-operating lever D.
Figure 16:
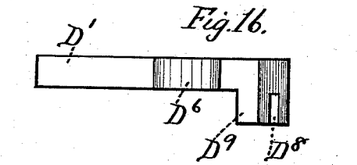
Fig. 16 is a view in side elevation of the valve-operating lever D'.
Figure 17:
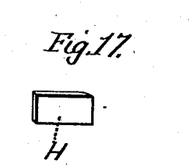
Fig. 17 is a view in perspective of lever-locking slide-stop detached.
Figure 18:
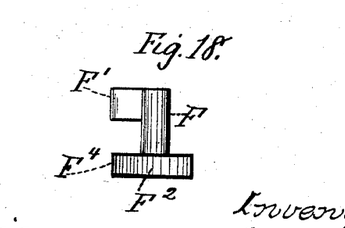
Fig. 18 is a view in side elevation of a double-trippet device.

Referring to the two sheets of drawings containing the last several figures, I have marked the two levers which operate the valve-head and gates, respectively, D and D', to distinguish them from the similar levers designated in Fig. 1, respectively, $B^{19}$ and $B^{15}$. All the functions of the latter levers are performed by the former; but the lever D is provided with an aperture $D^2$, adapted to receive the double trippet F, located between its operating-handle $D^3$ and its head, which has the aperture $D^4$, adapted to receive the valve-stem and the cam $D^5$. The other lever D' has its aperture $D^6$ adapted to receive the sleeve of the gate-actuating cams located intermediately of its ends. One end is provided with a slot $D^7$, adapted to receive the finger F'. The other end is provided with a slot $D^8$, adapted to receive the slide-stop H, and with a downwardly-projecting lug or arm $D^9$, adapted to engage with the stop J on the end of the circular flange J', projected upward from the cap $A^3$. The cap is also provided with a central boss surrounding the valve-stem, which has a portion of its periphery cut away, so as to present a shorter radius from the end $J^2$ of flange J' to the projecting stop $J^3$, a small portion being still further cut away contiguous to the stop to form the notch $J^4$. The double trippet F consists of a cylindrical stem provided at its upper end with a finger F' and at its lower end with a foot having two concave sides $F^2$ and $F^3$, about right angular to each other and forming at their junction a tripping-toe $F^4$. The trippet is secured to the lever D, while detached from the valve-stem, by inserting the finger through the slot $D^2$, as shown in Fig. 15. The trippet is then turned to one of the positions shown in Figs. 12 and 13 and the lever secured to the cam-sleeve. The lever D' is then secured to the valve-stem, as shown, for example, in the position shown in Fig. 12, with the valve open.

Figure 13:
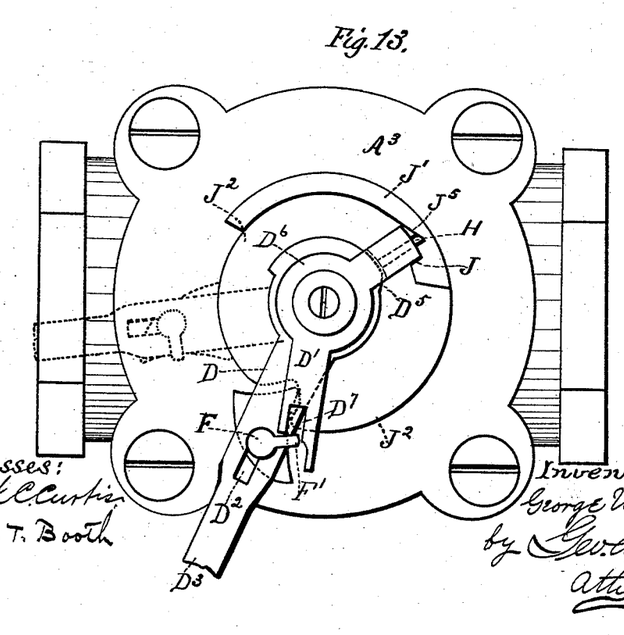
Fig. 13 is a similar view showing the position of the parts when the valve is closed.
Figure 14:
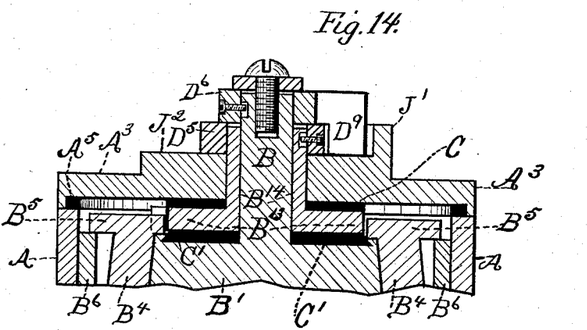
Fig. 14 is a central vertical section on the broken line $x\ x$ in Fig. 12.

To close the valve, the operating-lever D is moved to the left and the concave side $F^3$ of the trippet, traveling along in contact with the convex surface of the cap-boss, is prevented from rotating, so that the finger, resting in the slot $D^7$, carries the lever D' with it until that lever reaches the position shown in Fig 13, when the lug $D^9$ strikes the stop J and arrests its movement in that direction, the valve being closed. As the lever D advances to seat the gates the toe of the trippet is forced into the notch $J^4$ far enough to permit the finger to escape from the slot in the lever D'. The movement of lever D is continued until the gates are firmly seated by the action of the cams upon the gate-seating levers, as before explained, for example, to the position shown in Fig. 13.

To open the valve, the lever D is moved in the opposite direction to the right. When the lever reaches the position shown by the solid lines in Fig. 13, the gates have been loosened from their seats by releasing them from the influence of the cams and levers and the finger is forced into the slot $D^7$ by the toe $F^4$ tripping upon the stop $J^3$, which gives the trippet a quarter-turn, changing its position relative to the levers from that shown by the dotted lines in Fig. 13 to that shown by solid lines in Fig. 12, which causes the finger to engage with the lever D' and carry it to the position shown in Fig. 12. When the lever D reaches the position shown in Fig. 13, it is stopped, as before explained, and the continued movement of the lever D brings its cam $D^5$ into engagement with the slide-stop H, which forces the latter from the position relative to lever D' shown by dotted lines in Fig. 12 to that shown partly by dotted and partly by solid lines in the same figure and into the notch $J^5$, where it is held by the cam in every position of lever D after it leaves the other lever, thus effectually locking the lever D', and through it the valve, in position, so that they cannot be moved except by the lever D. The trippet cannot be removed from its position in lever D without detaching the latter from the cam-sleeve, and it cannot possibly get out of place or order, as it is made of a single casting and is entirely free from rivets or similar fastenings.

What I claim as new, and desire to secure by Letters Patent, is—

1. A valve-case provided with a cylindrical valve-chamber open at one end and having lateral valve-passage-way openings surrounded by gate-seats, in combination with a gate-supporting head rotary in such chamber and provided with a central transverse valve passage-way, also with a valve-stem projecting without the chamber, detachable gates having a circular periphery corresponding with the circular periphery of the chamber, means for seating the gates across the lateral case-openings, as levers $B^4$ and cams $B^{13}$, a chamber-closing cap, as $A^3$, having a stem-opening and means for rotating the valve, substantially as described.

2. A valve-case provided with a central cylindrical valve-chamber and lateral valve-passage-way openings surrounded by gate-seats, in combination with a gate-supporting head B', rotary in such chamber and provided with a stem B, passage-way $B^{12}$, gate-flanges $B^2$, projecting from depressed or flat surfaces $B^{11}$, and lever-receiving groove $B^3$, a detachable gate $B^6$, having a circular periphery corresponding with the circular periphery of the chamber, also flanges and lever-receiving grooves $B^9$ and $B^7$, and a lever-operating cam, substantially as described.

3. A valve-case provided with a cylindrical valve-chamber open at one end and having lateral passage-way openings, in combination with a cylindrical valve rotary in such chamber, provided with a transverse passage-way and with a screw-threaded stem projecting without the chamber, a chamber-closing cap provided with a stem-aperture, a ring or boss surrounding the stem between the cap and the valve, and a stem-nut on the outer side of the cap, substantially as described.

4. A valve-case provided with a cylindrical valve-chamber open at one end and having lateral passage-way openings, in combination with a cylindrical valve rotary in such chamber, provided with a transverse passage-way, gates, cam-actuated gate-levers, and a screw-threaded stem projecting without the chamber, revoluble cams for actuating the gate-levers, having an actuating-sleeve projecting without the chamber and inclosing the stem, a chamber-closing cap provided with an aperture for the valve-stem and cam-flange, a ring or boss surrounding the stem between the cam and valve-head, a ring or boss surrounding the cam-flange between the cams and cap, and a stem-nut on the outer side of the cap, substantially as described.

5. In a valve comprising a case with a cylindrical chamber closed at one end by a detachable cap and having lateral passage-way openings, a valve rotary in such case, consisting of a head with a projecting screw-threaded stem, detachable gates, and gate-levers, the combination, with the projecting stem and gate-lever-actuating cams located within the chamber and having a stem-inclosing sleeve projecting without such chamber, of two levers located without the chamber and secured one to the projecting stem and the other to the projecting cam-sleeve, the latter lever being provided with an operating-handle and means for automatically engaging and disengaging with the other lever, as the double trippet F, with its guides and stops, substantially as described, and a valve-stop, as J, substantially as described.

6. In a valve, the combination, with the valve-stem projecting exteriorly of the valve-inclosing case, of an operating-lever fixed upon such stem, a slide-stop H, mounted upon such lever, a stop-actuating cam, as $D^5$, fixed upon an independent lever, as D, and a stop-controlling catch, as the edge walls of notch $J^5$, substantially as described.

In testimony whereof I have hereunto set my hand this 14th day of December, 1888.

GEORGE W. BURR.

Witnesses:
GEO. A. MOSHER,
CHAS. L. ALDEN.